United States Patent
Parra Ortiz et al.

(10) Patent No.: US 9,963,038 B2
(45) Date of Patent: May 8, 2018

(54) PORTABLE ELECTRIC VEHICLE CHARGING DEVICE

(71) Applicant: SCHNEIDER ELECTRIC USA, INC., Palatine, IL (US)

(72) Inventors: Jose Enrique Parra Ortiz, Monterrey (MX); Jose Gerardo Muniz Elizondo, San Nicolas de los Garza (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 300 days.

(21) Appl. No.: 14/774,915

(22) PCT Filed: Mar. 15, 2013

(86) PCT No.: PCT/US2013/032294
§ 371 (c)(1),
(2) Date: Sep. 11, 2015

(87) PCT Pub. No.: WO2014/143006
PCT Pub. Date: Sep. 18, 2014

(65) Prior Publication Data
US 2016/0023562 A1  Jan. 28, 2016

(51) Int. Cl.
*H02J 7/00* (2006.01)
*B60L 11/18* (2006.01)

(52) U.S. Cl.
CPC ...... *B60L 11/1816* (2013.01); *B60L 11/1824* (2013.01); *B60L 11/1838* (2013.01);
(Continued)

(58) Field of Classification Search
CPC ............. Y02T 10/7088; Y02T 10/7241; Y02T 10/7005; Y02T 90/14; Y02T 90/128;
(Continued)

(56) References Cited

U.S. PATENT DOCUMENTS 5,581,171 A    12/1996  Kerfoot et al.
6,636,015 B1 *  10/2003  Levine ................ H01M 2/1072
                                         320/104
(Continued)

FOREIGN PATENT DOCUMENTS

WO    2012/154990 A2    11/2012

OTHER PUBLICATIONS

International Search Report and Written Opinion dated Jun. 11, 2013 in International Application No. PCT/US13/32294, 12 pages.

*Primary Examiner* — Nha Nguyen
(74) *Attorney, Agent, or Firm* — Locke Lord LLP

(57) ABSTRACT

A portable, lightweight electric vehicle charging device includes a set of connector cables adapted to connect to battery terminals of first vehicle having an internal combustion engine and includes an EV cable adapted to connect via an EV power connector to a charging port of a second vehicle that is an electric vehicle. The charging device receives DC power from the battery terminals of the alternator, converts it to AC power using an inverter, conditions the output of the inverter, and outputs AC power of at least about 50 watts continuous to the electric vehicle charging port. In other aspects, higher levels out output power are provided, up to about 325 watts continuous, as is limited by the configuration of the charging device circuit and the power output of the first vehicle's alternator.

19 Claims, 12 Drawing Sheets

(52) U.S. Cl.
CPC ......... *H02J 7/0054* (2013.01); *B60L 2230/12* (2013.01); *B60L 2230/16* (2013.01); *B60L 2230/20* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC .... Y02T 90/121; Y02T 90/163; H02J 7/0054; H02J 7/0055; H02J 7/0027; B60L 11/1816; B60L 11/1824; B60L 11/1838; B60L 2230/12; B60L 2230/16; B60L 2230/20
See application file for complete search history.

(56) References Cited

U.S. PATENT DOCUMENTS

| | | | |
|---|---|---|---|
| 7,057,371 B2 | 6/2006 | Welchko et al. | |
| 9,266,438 B2* | 2/2016 | Power | B60L 11/1809 |
| 9,509,144 B1* | 11/2016 | Mellon, Jr. | H02J 4/00 |
| 9,623,752 B2* | 4/2017 | Mouri | B60L 11/1881 |
| 2004/0262062 A1 | 12/2004 | Berbari | |
| 2011/0055037 A1* | 3/2011 | Hayashigawa | B60L 3/0069 705/26.1 |
| 2012/0109763 A1* | 5/2012 | Laughner | B60L 11/02 705/17 |
| 2012/0206100 A1 | 8/2012 | Brown et al. | |
| 2012/0286720 A1* | 11/2012 | Fassnacht | B60L 3/0046 320/105 |
| 2012/0303397 A1* | 11/2012 | Prosser | H02J 7/0054 705/7.12 |
| 2012/0315801 A1 | 12/2012 | Kwasny et al. | |
| 2013/0020993 A1* | 1/2013 | Taddeo | H02J 7/0027 320/109 |
| 2013/0076123 A1* | 3/2013 | Suzuki | B60L 11/1816 307/9.1 |
| 2013/0175990 A1* | 7/2013 | Jung | B60L 11/126 320/109 |
| 2013/0187449 A1* | 7/2013 | Mouri | B60L 11/1881 307/10.1 |
| 2015/0015183 A1* | 1/2015 | Pursifull | B60L 11/1816 320/105 |
| 2015/0217656 A1* | 8/2015 | Loftus | H02J 7/0065 320/136 |

* cited by examiner

| Driving Condition | Speed | | Temperature | | Total Drive Duration | Range | | Air Conditioner |
|---|---|---|---|---|---|---|---|---|
| | mph | Km/h | °F | °C | | mi | km | |
| Cruising (ideal condition) | 38 | 61 | 68 | 20 | 3 hr 38 min | 138 | 222 | Off |
| City traffic | 24 | 39 | 77 | 25 | 4 hr 23 min | 105 | 169 | Off |
| Highway | 55 | 89 | 95 | 35 | 1 hr 16 min | 70 | 110 | In use |
| Winter, stop-and-go traffic | 15 | 24 | 14 | -10 | 4 hr 08 min | 62 | 100 | Heater on |
| Heavy stop-and-go traffic | 6 | 10 | 86 | 30 | 7 hr 50 min | 47 | 76 | In use |
| EPA five-cycle tests | n.a. | | | | | 73 | 117 | Varying |

Summary of the Nissan's results using EPA L4 test cycle operating the Leaf under different real-world scenarios

FIG. 1

Alternator output of standard ICV

| ICV alternators | Amperage |
|---|---|
| Dodge truck | 90 |
| GM truck | 140 |
| Chevrolet. Astra, Corsa | 100 |
| Chevrolet. Chevy | 70 |
| Dodge Ram Truck | 117 |
| Nissan Tsuru I | 60 |
| Nissan Tsuru II | 55 |
| Nissan Plantina | 90 |
| Ford Fiesta, Ikon, Ka | 75 |
| VW Golf, Pointer, Polo Gol, Fox | 70 |
| VW Jetta | 90 |
| Toyota Corolla | 45 |
| Mazda | 50 |
| Mercedes Benz | 110 |
| Dodge Atos | 70 |
| Peugeot sedan | 105 |
| Ford Mustang | 130 |

| Manufacturer | Brand | Amperage Min | Amperage Max |
|---|---|---|---|
| Audi | A4 | 90 | 150 |
| BMW | 320i |  | 105 |
| Chevrolet | Astr, Corsa., Vista | 65 | 120 |
| Fiat | Palio | 65 | 120 |
| Ford | Escort, Fiesta | 70 | 90 |
| Ford | Ka | 70 | 75 |
| Ford | Mondeo | 90 | 105 |
| Peugot | 206, 307 |  | 150 |
| Peugot | 405, 406 | 70 | 80 |
| Renault | Clio, Megane | 87 | 98 |
| Seat | Cordoba |  | 70 |
| Volkswagon | Gol, Golf, Pointer | 65 | 90 |
| Volkswagon | Golf, Jetta, Passat | 90 | 150 |

| | Amperage | Power (W) | Voltage | |
|---|---|---|---|---|
| Minimum alternator current: | 45 | 562.5 | 12.5 | → Low capacity car |
| Max alternator current: | 150 | 1875 | 12.5 | → High capacity car |

FIG. 6

Charger power delivery (in watts) and charging time (in hours)

| "On board" charger | Residential Charger | EVPC with low capacity car (45A) | EVPC with high capacity car (150A) | EVPC with super-duty truck (~200A) |
|---|---|---|---|---|
| 1200 W | 3000 W | 562.5 W | 1875 W | 2500 W |
| 20 Hr | 8 Hr | 42.67 Hr | 12.80 Hr | 9.60 Hr |

FIG. 7

PORTABLE ELECTRIC VEHICLE CHARGING DEVICE

FIELD OF THE INVENTION

The present disclosure pertains generally to charging devices and systems for charging an electric vehicle.

BACKGROUND

Conventional pure electrical vehicles ("EV") are typically range-limited. The 2013 Tesla Model S electric vehicle provides a variety of battery systems of increasing capacity, and correspondingly increasing expense, of 40 kWh, 60 kWh and 85 kWh, with respective ranges of 160 miles, 230 miles, and 300 miles. However, given the expense of high-range battery systems, many EVs have more modest ranges. As one example, the 2013 Nissan Leaf® electric vehicle has a range of "up to" about 75 miles on a single charge from its more conventionally-sized 24 kWh Lithium-Ion battery system manufactured by Automotive Energy Supply Corporation (AESC).

Unfortunately, the maximum potential range is often not achieved in the manner that EVs are typically driven and the actual range a moving target. The operative range of an EV is complicated by the numerous environmental variables (e.g., weather, temperature, traffic, etc.) and vehicle variables (e.g., use of air conditioning/heating, lights, etc.) so that the actual range on any given day may vary markedly from the range of the same car on prior commutes between the same points. FIG. 1 provides an example of such range variability for the Nissan Leaf® EV for the 2011/2012 model year. Even amongst governmental organizations, the estimated range for this specific vehicle cannot be agreed upon. The United States Environmental Protection Agency estimates the range of the Nissan Leaf® EV to be 73 miles, whereas the United States Federal Trade Commission, estimates the range of the Nissan Leaf® EV to be between 96-110 miles and the New European Driving Cycle estimates the range of the Nissan Leaf® EV to be about 109 mi. Third-party sources indicate that the range available from a single charge can vary up to 40% in real-world situations depending on driving style, load, traffic conditions, weather (i.e. wind, atmospheric density), and accessory use. Nissan itself determined that the range of the Nissan Leaf® EV, in a "worst case" scenario, could be only 47 miles on a full charge.

To further illustrate this variability, FIG. 1 shows a table summarizing the ranges of a Nissan Leaf® EV under a number of scenarios tested using EPA's L4 test cycle. When cruising at a constant speed (an ideal condition) at 38 mph at a temperature of 68° F., with the air conditioner off, the range is 138 miles over a drive duration of 3 hours, 38 minutes. Driving in city traffic at 24 mph at a temperature of 77° F., with the air conditioner off, yields a range of 105 miles over a drive duration of 4 hours, 23 minutes. Driving on the highway at 55 mph at a temperature of 95° F., with the air conditioner in use, yields a range of 70 miles over a drive duration of 1 hour, 16 minutes. Driving in winter stop-and-go traffic at 15 mph at a temperature of 14° F., with the heater on, yields a range of 62 miles over a drive duration of 4 hours, 8 minutes. Driving in heavy stop-and-go traffic at 6 mph at a temperature of 86° F., with the air conditioner on, yields a range of 47 miles over a drive duration of 7 hours, 50 minutes. Notably, these results assume a driving speed of no more than 55 mph and the effect of wind resistance (and vehicle drag) increases with increasing speed, further limiting the range of the EV. By way of comparison, United States Department of Energy studies concluded that, for conventional internal combustion vehicles, the average car will be at its advertised MPG at 55 mph, but as the speed increases such vehicle is about 3% less efficient at 60 mph, 8% less efficient at 65 mph, 17% less efficient at 70 mph and 23% less efficient at 75 mph.

This variability gives rise to a fear in the driver of EVs that their vehicle may have insufficient range to reach the intended destination and may leave them stranded on the roadside, a fear now referred to as "range anxiety".

A variety of conventional charging sources are available to ease this anxiety. Conventional 120V household sockets and extension cords may be provided at common destinations (e.g., work parking lot, parking structures, residences, etc.), but this option can pose risks if used incorrectly, presents various limitations, and takes considerable time (e.g., 6 to 8 hours). Distributed charging stations are also being deployed by various governmental and/or private entities to facilitate greater utilization of EVs by effectively increasing their native ranges and/or by reducing range anxiety. By way of example, Tesla has developed and built a number of electric vehicle charging stations (e.g., a Tesla EV "Supercharge" station) along selected high volume traffic corridors. Other proposed solutions have included "swappable" battery systems available at battery exchange centers (see, e.g., U.S. Published Patent Application No. 2010/071979).

However, despite the growth of these enhancements to the use of EVs, the problem of range anxiety and, more particularly, actual depletion of EV batteries in the midst of a trip, remains unresolved.

To address the actual problem of stranded EVs, specialized road-side assistance vehicles have been proposed to use a master battery and converter to power EVs (see, e.g., U.S. Published Patent Application No. 2012/0271758 A1). This solution addresses the problem, but itself presents new problems, such as availability and arrival time.

BRIEF SUMMARY

According to an implementation of the present disclosure, a portable Electric Vehicle ("EV") Charging Device has been developed that can be used to provide at least a partial charge to an EV from another vehicle's internal combustion engine. Using the charging device and the other vehicle's engine power, enough of a charge can be provided to the EV so that the EV can make it home or to the nearest charging station. An EV, as used herein, refers to a vehicle whose driveline can be powered by at least an electric motor.

In general, EV charging devices in accord with the present concepts includes a housing having electrical cables (e.g., jumper cables) connected to a DC input terminal and an EV cable connected to an AC output terminal. The electrical cables have, at their ends, electrical connectors configured to attach to the battery terminals of an internal combustion engine. The EV cable has, as its end, an EV connector configured to connect to a charging input for an electrical vehicle. In the circuit between the input terminal and the output terminal is a circuit, comprising an inverter, configured to provide at least about 500 watts from the output terminal when connected to an alternator power output of about 45 Amps. In other aspects, the circuit is configured to provide up to about 2500 watts from the output terminal when connected to an alternator power output of about 200 Amps. In still other aspects, the circuit is configured to provide up to about 3250 watts from the output terminal when connected to an alternator power output of about 260 Amps.

A charging time of the electric vehicle is dependent on the power output of the EV charging device. The power output of the EV charging device is dependent not only on the configuration of the EV charging device circuitry, but also on the alternator output of the internal combustion vehicle ("ICV") to which the EV charging device disclosed herein is attached. For an EV charging device producing an output of about 560 watts, a charge time of 15 minutes may enable the electric vehicle to travel 1.24 miles. For an EV charging device producing an output of about 2500 watts, a charge time of 15 minutes may enable the electric vehicle to travel 5.49 miles.

In accord with at least some aspects of the present concepts, a portable electric vehicle (EV) charging device comprises a housing, a DC input having a positive terminal and a negative terminal, an AC output, an EV electrical connector comprising an EV cable having a first end connected to the AC output and having a second end bearing an EV connector and a circuit in the housing between the DC input and the AC output terminal, the circuit comprising an inverter rated for at least 500 watts continuous and configured to deliver AC power to the AC output. The portable electric vehicle charging device has physical dimensions and a weight sufficient for the portable electric vehicle charging device to be easily lifted from a storage area in a passenger vehicle and carried to a location permitting connection of the portable electric vehicle charging device to both an EV and an adjacently disposed internal combustion vehicle.

In accord with at least some aspects of the present concepts, a portable electric vehicle charging device comprises a) positive and negative battery connector cables, b) an EV cable comprising an EV power connector, c) an inverter rated for at least 500 watts continuous and d) a housing integrating at least b) and c) into a single unit, wherein the portable electric vehicle charging device is configured to be stowed within a passenger vehicle when not in use. In another, optional aspect, the positive and negative battery connector cables are also integrated into the housing.

The foregoing and additional aspects and implementations of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 1 is a performance summary for a 2011/2012 Nissan Leaf® EV under various driving conditions.

FIG. 6 presents tables of alternator outputs of exemplary internal combustion engine vehicles.

FIG. 7 is a table of charger power delivery and charging time for a variety of EV charging sources.

Figure 2:
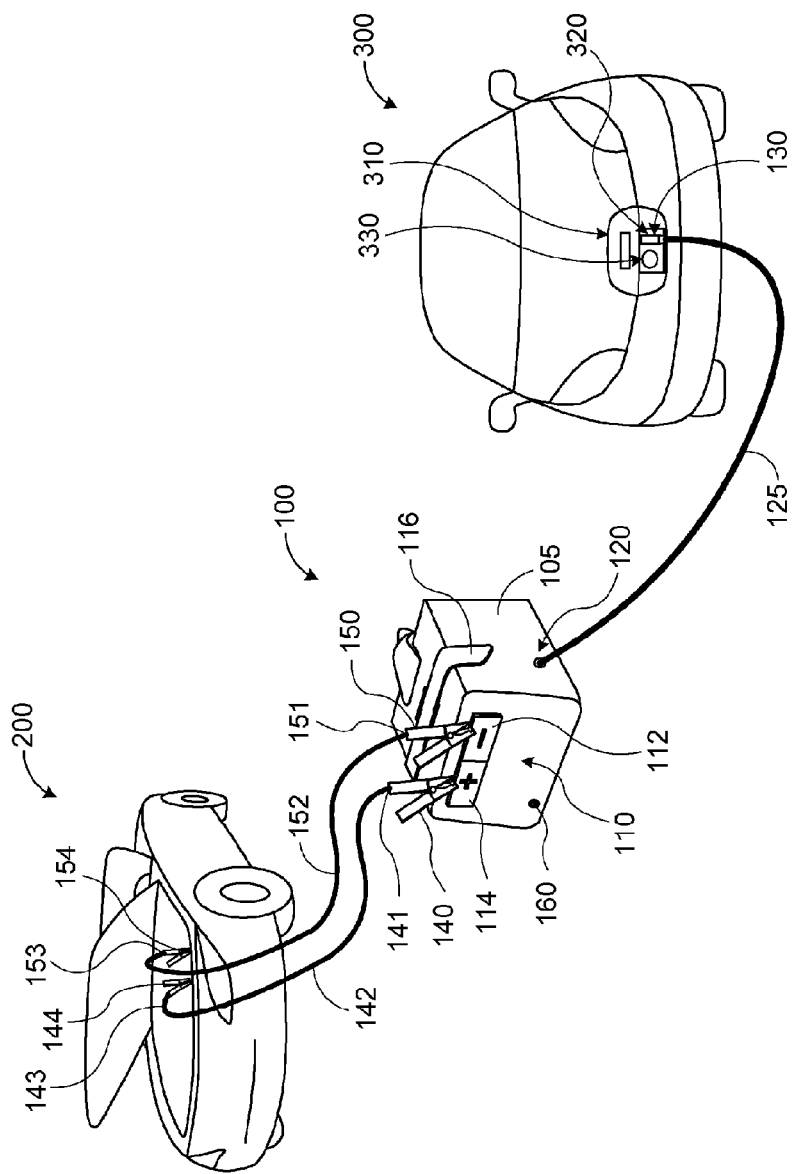
FIG. 2 depicts use of a portable electric vehicle charging device in accord with at least some aspects of the present concepts.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure covers all modifications, equivalents, and alternatives falling within the spirit and scope of the invention as defined by the appended claims.

DETAILED DESCRIPTION

Referring initially to FIG. 2, a portable electric vehicle ("EV") charging device 100 in accord with at least some aspects of the present concepts is shown. The portable EV charging device 100 includes a housing 105, a DC input 110 having a negative terminal 112 and a positive terminal 114, and an AC output 120. The portable EV charging device 100, connected as shown in FIG. 2, is able to pass electric current from an internal combustion vehicle 200 to an EV 300 by means of cables 142, 152, 125. Thus, where an EV 300 has a dead battery and is stranded on the side of a street or in a parking lot, the driver of the EV can remove the portable EV charging device 100 from a stowed compartment in the vehicle and position the portable EV charging device 100 adjacent the charge port 310. The driver of the EV can then enlist the assistance of a driver of an internal combustion vehicle 200 to provide, via the portable EV charging device 100, a minimal charge from the internal combustion vehicle to the EV 300 to permit the EV to reach a charging station.

As described herein, the portable EV charging device 100 is both small and lightweight. In the configuration shown in FIGS. 2-3, the portable EV charging device 100 has a height of 8.2 inches, a length of 9.8 inches, and a width of 9.8 inches. In the configuration shown in FIG. 4, the portable EV charging device 100 has a height of 13.7 inches, a length of 9.8 inches, and a width of 5.9 inches. The weight of both configurations is less than 15 pounds and may be less than 10 pounds. A variety of options, price points, and ratings may be advantageously provided to suit different needs of different end users. For example, some users may value low weight over cost and/or output while other users might value output above weight. Given this compact size, the portable EV charging device 100 is readily stored in the EV 300 (or other passenger vehicle), such as in a trunk (a.k.a. boot), under the front hood (a.k.a bonnet), or in a separate compartment in the trunk, under the front hood, or in the passenger compartment.

In the embodiment depicted in FIG. 2, the negative terminal 112 and positive terminal 114 of the portable EV charging device DC input 110 are respectively electrically connected, via battery connector cables 142, 152, to corresponding negative and positive terminals or posts of a battery (not shown) of an internal combustion engine vehicle 200. The battery connector cable 152, as shown, comprises a first end 151 connected to the negative terminal 112 of the DC input 110 via a terminal connector 150 and a second end 153 connected to the negative terminal of the vehicle 200 battery (not shown) via battery terminal connector 154. Correspondingly, the battery connector cable 142, as shown, comprises a first end 141 connected to the positive terminal 114 of the DC input 110 via a terminal connector 140 and a second end 143 connected to the positive terminal of the vehicle 200 battery (not shown) via a battery terminal connector 144.

As depicted in the example of FIG. 2, the battery connector cables 142, 152 are jumper cables (a.k.a. "jump lead" cables) having clamps at each end. The clamps (e.g., 150, 154) may comprise any mechanical connector including, but not limited to, an alligator-type clamp, parrot-type clamp, or mechanic-type clamp. In general, the battery connector cables 142, 152 are between #4/0 American Wire Gauge ("AWG") and #10 AWG, or between #2/0 AWG to #4 AWG. The gauge of the battery connector cables 142, 152 is preferably, but not necessarily, sized to correspond to the largest potential amperage expected during use (e.g., 260 amps) to enable the broadest usage of the portable EV charging device 100 with as many different internal combustion vehicles 200 as possible.

The EV cable 125 may comprise any commercially available EV cable such as, but not limited to, the CarolGrene™ Ultra Flex® EV cables, which are compatible with conventional EV connectors (e.g., the SAE J1772 connector, or other EV connector, may be connected to the AC output 120 via such EV cable).

In another aspect of the present concepts, rather than having removable battery connector cables 142, 152, the battery connector cables are integrated with the portable EV charging device 100. In other words, the end 151 of battery connector cable 152 is fixed to the negative terminal 112 and the end 141 of battery connector cable 142 is fixed to the positive terminal 114. In such a configuration, the negative terminal 112 and positive terminal 114, and corresponding ends 141, 151 of the battery connector cables 142, 152, may be advantageously disposed within the housing 105.

The portable EV charging device 100 AC output 120 may also comprise either of an EV cable 125 fixed to the AC output 120 (e.g., fixed inside of or outside of the housing 105) or a removable EV cable removably attached to the AC output. Opposite to the end of the EV cable 125 connected to the AC output 120, the EV cable 125 comprises an EV connector 130. In at least one aspect of the present concepts, the EV connector 130 comprises a Society of Automotive Engineers (SAE) J1772, Revision B connector (USA). In another aspect of the present concepts, the EV connector 130 comprises a SAE J1772 "combo" AC/DC connector. In still other aspects, the EV connector 130 comprises any other EV plug such as, but not limited to, a Tesla plug, inductive paddles, an Avcon connector, a Dodge EV receptacle connector, a Ford Focus EV "Mule" receptacle connector, a Ford Escape receptacle 1 or 2 connector, an Aptera-2e plug, a Saturn Hybrid plug, a Concept Chevy Volt plug, a Prototype Chevy Volt plug, a Mini E plug, a Smart ED receptacle connector, a Think City receptacle connector, an Original i-MiEV 120V/240V receptacle connector, or any later developed EV connector.

The housing 105 may include one or more displays or meters (not shown) and/or one or more indicators 160 adapted to convey, to a user, information on a status of the portable EV charging device 100 and/or constituent elements thereof. For example, a first LED may provide an indication as to the presence of (e.g., via an LED), or a sufficiency of (e.g., via a meter), a suitable DC input 110 and second LED may provide an indication as to the presence of (e.g., via an LED), or a sufficiency of (e.g., via a meter), a suitable AC output 120. An on/off button and/or indicator may also be provided.

Figure 3:
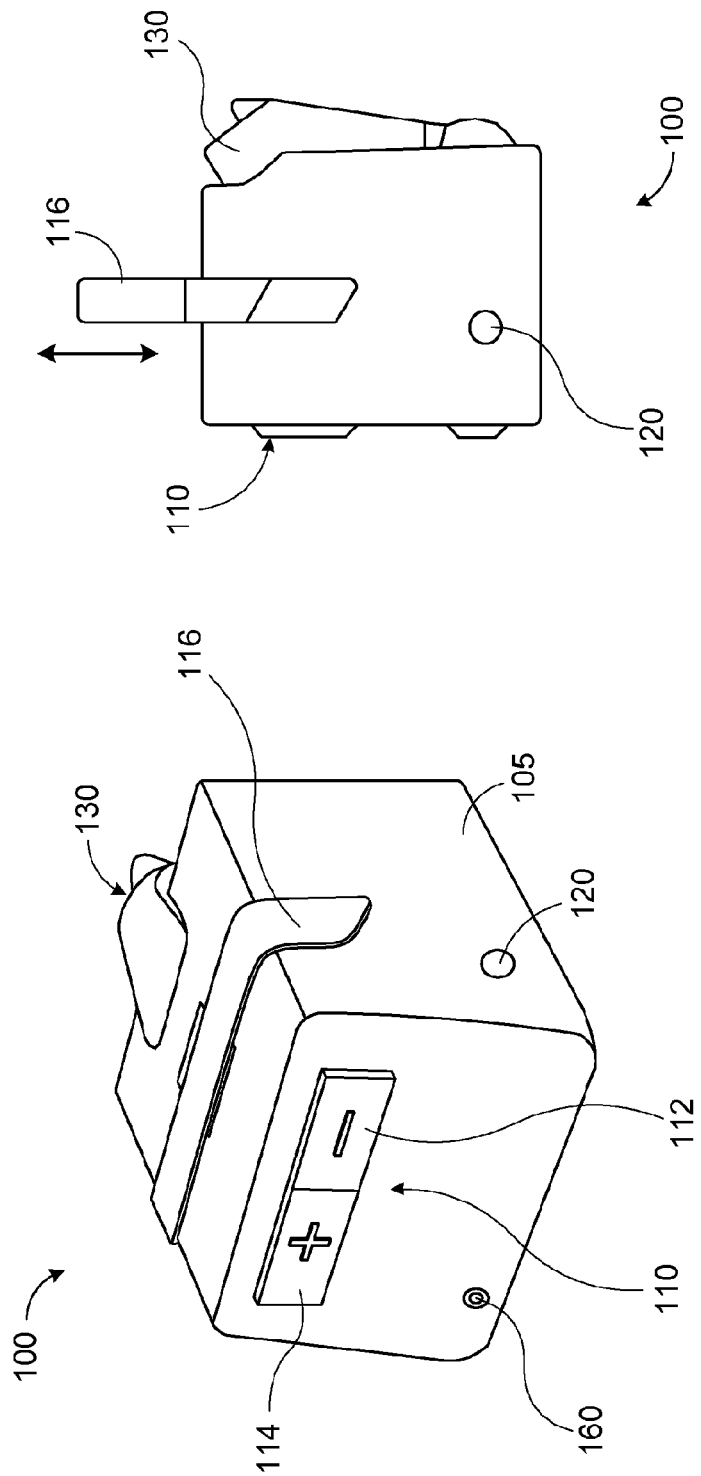
FIG. 3 depicts a perspective view and a side view, respectively, of a portable electric vehicle charging device in accord with at least some aspects of the present concepts.

FIG. 3 depicts a perspective view and a side view, respectively, of the portable electric vehicle charging device 100 depicted in FIG. 2. As shown by the arrow in FIG. 3, the handle 116 may be movable up or down. In addition to, or alternatively, the handle 116 may optionally rotate about a fixed axis or pivot points. In this way, the handle 116 may be extended and/or rotated to permit manipulation of or movement of the portable EV charging device 100 and retracted and/or rotated to minimize the overall size of the device to facilitate storage. FIG. 3 shows an example where an integral EV connector 130 is retained in a mating portion of the housing 105 when not in use. The housing 105 may optionally comprise one or more internal compartments (not shown) to store, in a stowed condition, the first battery connector cable, the second battery connector cable, and/or the EV connector.

Although not shown, the housing 105 may comprise features to facilitate a placement of the portable EV charging device 100 in various positions relative to the EV 300 and/or internal combustion engine vehicle 200 when deployed. By way of example, a bottom of the housing may comprise a rubber, high-friction bottom to permit the portable EV charging device 100 to be rested on a car without untoward risk of scratching a vehicle's paint. As another example, one or more securement latches could optionally be provided to assist in physically anchoring the portable EV charging device 100 in an operable position (e.g., where the vehicles are on a hill or incline).

Figure 4:
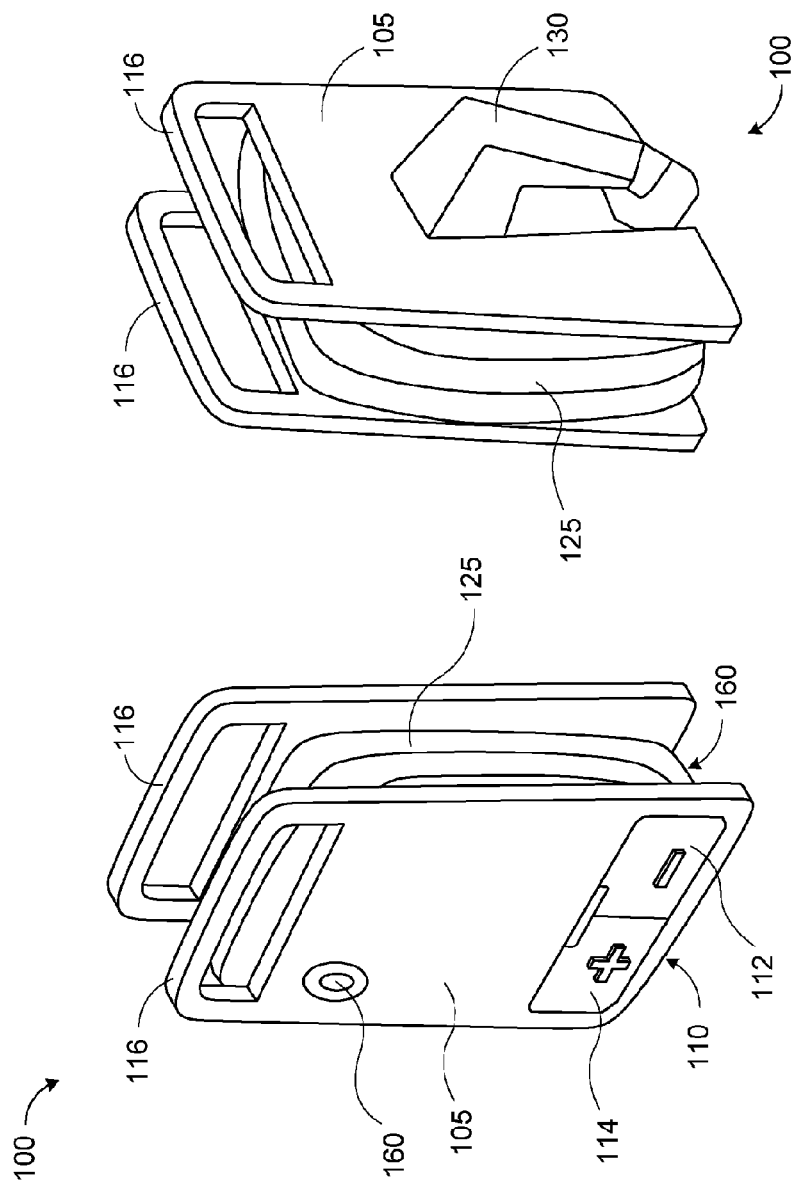
FIG. 4 depicts a perspective view and a side view, respectively, of another example of a portable electric vehicle charging device in accord with at least some aspects of the present concepts.
Figure 5:
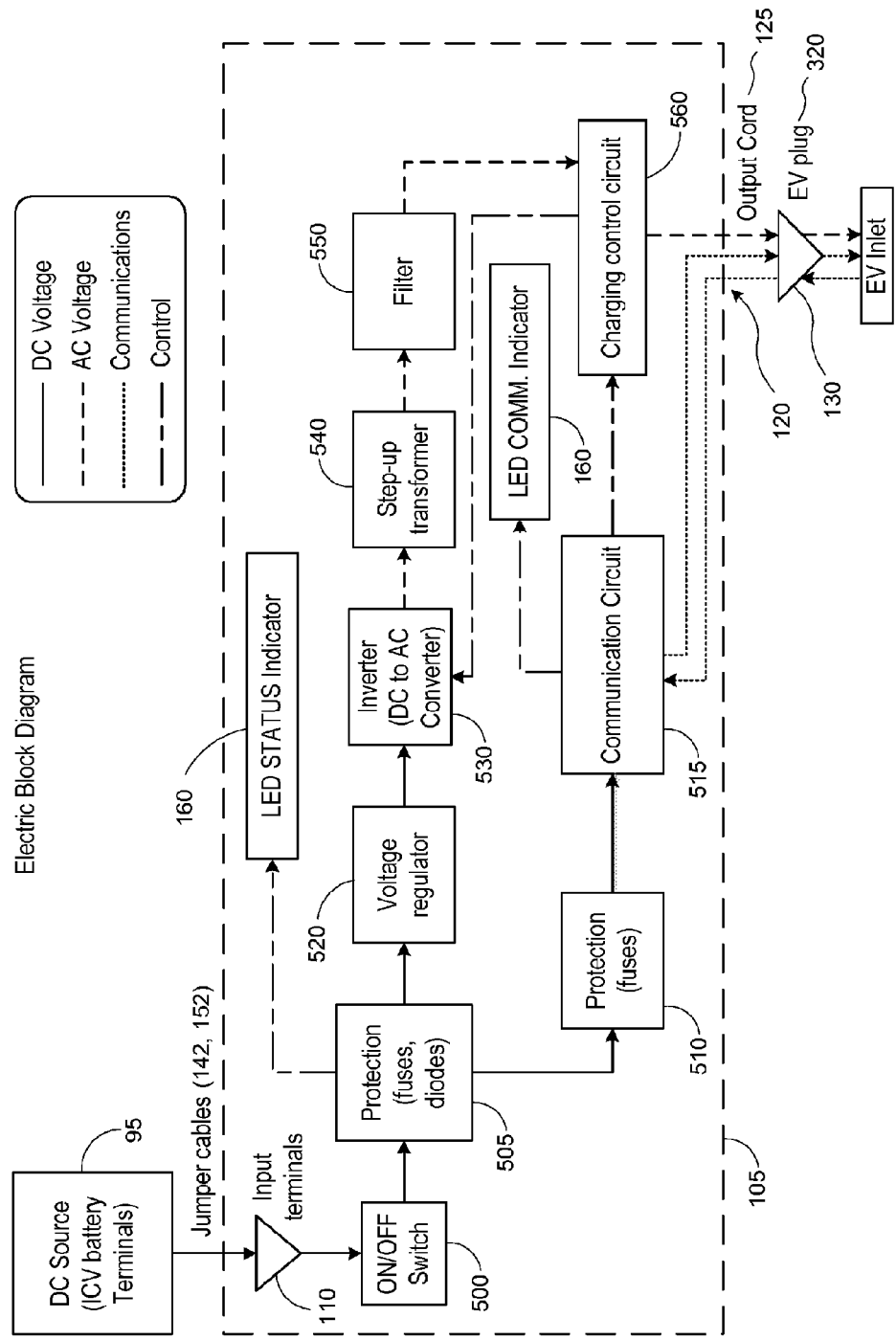
FIG. 5 is an electric block diagram of one embodiment of a portable electric vehicle charging device in accord with at least some aspects of the present concepts.

FIG. 4 shows a perspective view and a side view, respectively, of another example of a portable EV charging device 100 wherein the housing 105 itself defines a generally annular cable management system 160 about which one or more of the battery connector cables 142, 152 and/or the EV cable 125 are wound during storage and secured therein. The circuitry between the DC input 110 and the AC output 120, described below in relation to FIG. 5, is advantageously disposed within the annular hub. The housing 105 further defines a first handle and a second handle, generally denoted by reference numeral 116, and the portable EV charging device 100 may be moved using one or both of the handles 116. The EV connector 130 is shown in a stowed condition, locked in place in the housing 105.

FIG. 5 shows an electric block diagram of one embodiment of a portable electric vehicle charging device 100. The upper left portion of FIG. 5 shows a vehicle DC source 95 comprising internal combustion vehicle (ICV) battery terminals. The positive battery terminal of the vehicle battery, in turn, is connected to the vehicle alternator and the negative battery terminal is connected to ground. The alternator converts the mechanical energy of the internal combustion engine of vehicle 200 into AC current which is then rectified into DC current using a rectifier (e.g., diode rectifier bridge, etc.) and a voltage regulator is used to provide a substantially consistent voltage (e.g., 12.5 V or some other voltage between 12.5V and about 14.5V) at the battery terminals.

FIG. 6 presents tables of alternator outputs of exemplary internal combustion engine vehicles. In the left-most table, different internal combustion engine (ICV) alternators are listed together with corresponding amperages. The General Motors (GM) truck is shown to have an amperage of 140 amps, whereas the Toyota Corolla car is shown to have an amperage of only 45 amps. In the right-most table, a variety of different makes (manufacturer) and models (brands) of passenger ICVs are listed together with corresponding minimum and maximum amperages. The Audi A4 car is shown to have a minimum amperage of 90 amps and a maximum amperage of 150 amps, whereas the Ford Ka car is shown to have a minimum amperage of 70 amps and a maximum amperage of 75 amps. The bottom-most table of FIG. 6 shows a summary of the ranges presented in the sample population. A "Low Capacity" ICV provides a minimal alternator current amperage of 45 amps, corresponding to a power of 562.5 Watts (W), whereas a "High Capacity" ICV provides, by way of example, a maximum alternator current amperage of 150 amps, corresponding to a power of 1875 Watts (W). Thus, at a 12.5 V output, for example, the output power (in Watts) of the portable EV charging device 100 is different for different ICV alternators, as further described below.

Returning to FIG. 5, the ICV DC source 95 is shown to be connected to the DC input 110 (via terminals 112, 114), at output of which is regulated by On/Off switch 500 configured to open/close the circuit. Downstream of the On/Off switch 500 are conventional protective devices 505, 510, such as fuses and diodes, to protect the integrity of the circuit as well as connected sub-circuits, systems and components. The fuses protect both the charger and the battery, should any failure occur and the diodes (or similar circuits) are used to prevent any possible voltage leaking back to the battery.

A LED status indicator 160, as discussed above in relation to FIG. 2, is provided to indicate that power is provided to the portable EV charging device 100. A voltage regulator 520 is provided to maintain a constant voltage (e.g., 12.5V) for the solid-state inverter 530, which converts the direct current to alternating current (e.g., true sine wave, a modified sine wave, or square wave output), which is changed to an appropriate voltage for output using the step-up transformer 540. The inverter 530 also includes protection against over-current and may be set to around 300 amps for an inventor configured to handle charging from a "Super Duty" truck (e.g., greater than the 260 A capacity of "Super Duty" trucks). As to the step-up transformer 540, the step-up transformer increases the voltage from the inverter to, for example, a 240 V modified sine wave form. In some aspects, the transformer is on the order of 3500 VA (e.g., higher than 12.5V*260 A).

In at least some aspects of the present concepts, the inverter 530 is rated for at least about 600 Watts continuous. In other aspects of the present concepts, the inverter 530 may be rating up to any upper practical limit such as, but not limited to 3250 Watts continuous in correspondence with an upper limit of ICV alternator output. One exemplary inverter suitable for most applications for which the present concepts would apply may be satisfied by an inventor have a 12 VDC Input, a 240 VAC output, and a 3250 Watts power output outputting a modified sine wave or a pure sine wave. An example of an inverter that could be used in accord with the present concepts includes the AIMS 3600 Watt Power Inverter, Model #: pwrinv360012w.

A harmonics filter 550, such as but not limited to a resistor-inductor (RL), is provided to eliminate or at least attenuate unwanted harmonics that come from the downstream circuit. The output of the RL filter 550 is output to the charging control circuit 560, which also receives control input from a communication circuit 515 (e.g., a low amperage fuse to protect the communication and control circuit) in communication with the EV connector or plug 130. The charging control circuit 560 regulates the charging of the EV 300. The charging control circuit 560 performs functions including 1) establishing communication with the EV 300, 2) permitting the inverter 530 to operate when the EV is ready to receive charge, 3) allowing the current to flow to the EV, 4) stopping the flow of the electric current whenever the user wants, 5) blocking the operation of the inverter to safely disconnect the plug and 6) ending the communication with the EV. The "LED COMM. Indicator" 160 indicates that the communication between the charger and the EV is being made successfully (e.g., LED blinking similar to modems and computers). If the led is steady either in ON or OFF, then it will mean that an issue has occurred.

FIG. 7 is a table of charger power delivery and charging time for a variety of EV charging sources for a typical EV, such as a Nissan Leaf® EV. A typical "on board" charger configured to be attached to a 120V outlet provides between about 1200 Watts and takes from between about 20-21 hours to charge the EV. This estimate is based on a battery capacity of 24 kW and considers the time required to take an empty battery to 100% charge. A residential charger, such as a 240 Volt EVSE unit, can output about 3000-3300 Watts and can charge the EV in about 8 hours. Of course, the present concepts are not directed to fully charging a stranded vehicle, but rather to provide a sufficient rate of charge that such a stranded vehicle can receive enough of a charge from the ICV 200 to get home or to get to a charging station. The faster that the ICV 200 is able to deliver power to the battery system of the EV, the faster both vehicles are able to set off on their ways.

FIG. 7 also shows the charger power delivery and charging time for the disclosed portable electric vehicle charging device 100 for a typical EV, such as a Nissan Leaf® EV. For a "Low Capacity" ICV, such as a Toyota Corolla car, the 45 Amp alternator is only able to output about 562.5 Watts, which would yield a charging time of about 42.67 hours. In contrast, a "High Capacity" ICV, such as an Audi A4 car, with its 150 Amp alternator, is able to output about 1875 Watts, which would yield a charging time of about 12.80 hours. Further, a "Super Capacity" ICV, such as a Ford Super-Duty truck (e.g., 250-350 F Series) having a 200 Amp alternator, is able to output about 2500 Watts, which would yield a charging time of about 9.6 hours. Other Ford Super-Duty trucks having even higher capacity alternators, with the F550 Super-Duty truck having a 250 Amp alternator and the Ford 350F Super-Duty truck having a 260 Amp alternator.

As noted above, the estimated charge time for the EV was based on a battery capacity of 24 kW. Further, it is estimated that for a rated distance for the EV of 105.5 miles, based on an averaging of the United States EPA maximum range of 138 miles and EPA five-cycle test range of 73 miles from FIG. 1, the average power per mile in Watts is 227 Watts for the Nissan Leaf® EV to travel one mile. Using this conversion, the chart of FIG. 8 depicts estimates of the state of charge versus time and distance to travel versus time achievable by an embodiment of a portable electric vehicle charging device, in combination with a two different internal combustion engine vehicles.

Figure 8:
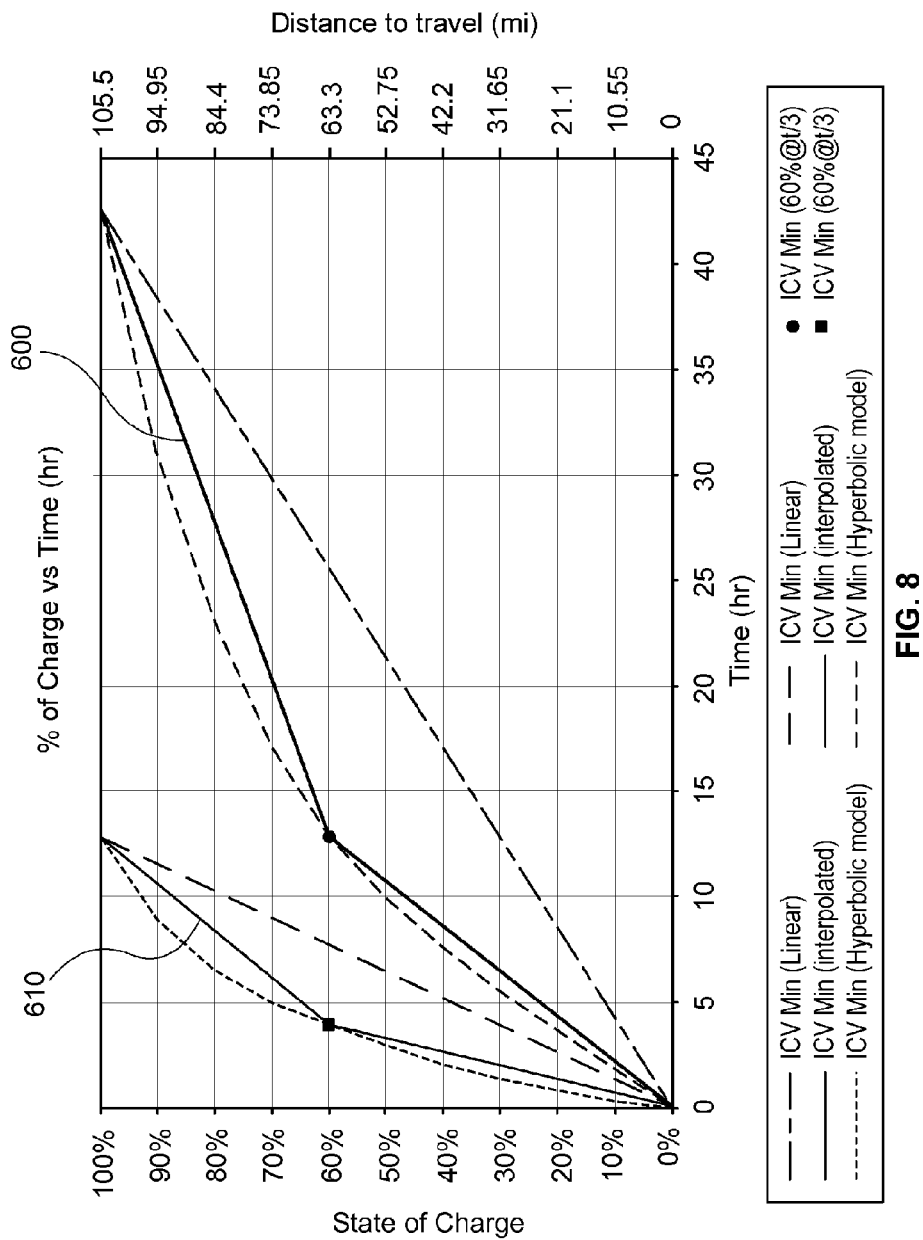
FIG. 8 is a chart depicting estimates of the state of charge versus time and distance to travel versus time achievable by an embodiment of a portable electric vehicle charging device, in combination with a two different internal combustion engine vehicles, in accord with at least some aspects of the present concepts.

FIG. 8 shows three plots for each of an ICV "Low Capacity" ICV (e.g., a Toyota Corolla), denoted as "ICV Min", and a "High Capacity" ICV (e.g., an Audi A4 car), denoted as "ICV Max". For each of the two ICV categories ("Min" and "Max"), a linear plot, hyperbolic model plot, and an interpolated plot are provided. For the ICV Min, both the leftmost plot (the hyperbolic model) and the rightmost plot (the linear model) terminate at a time of 42.67 hours for a 100% charge. The interpolated ICV Min plot 600 yields the same terminus in a 100% charge at 42.67 hours, but is indicated to reach a 60% charge at 12.80 hours in accord with the hyperbolic model, whereas the linear model predicts a 60% charge at 29.87 hours. In general, an average Li-Ion battery reaches 60% of charge in about $\frac{1}{3}^{rd}$ the time it takes to reach a full charge.

For the ICV Max in FIG. 8, the leftmost plot (the hyperbolic model) and the rightmost plot (linear model) both terminate at a time of 12.80 hours for a 100% charge, but do so along different paths, with the hyperbolic model showing a 60% charge at 3.84 hours and the linear model showing a 60% charge at 6.08 hours. The interpolated ICV Max plot 610, likewise terminates in a 100% charge at 12.80 hours and indicates a 60% charge at 3.84 hours, just as predicted by the hyperbolic model.

Figure 9:
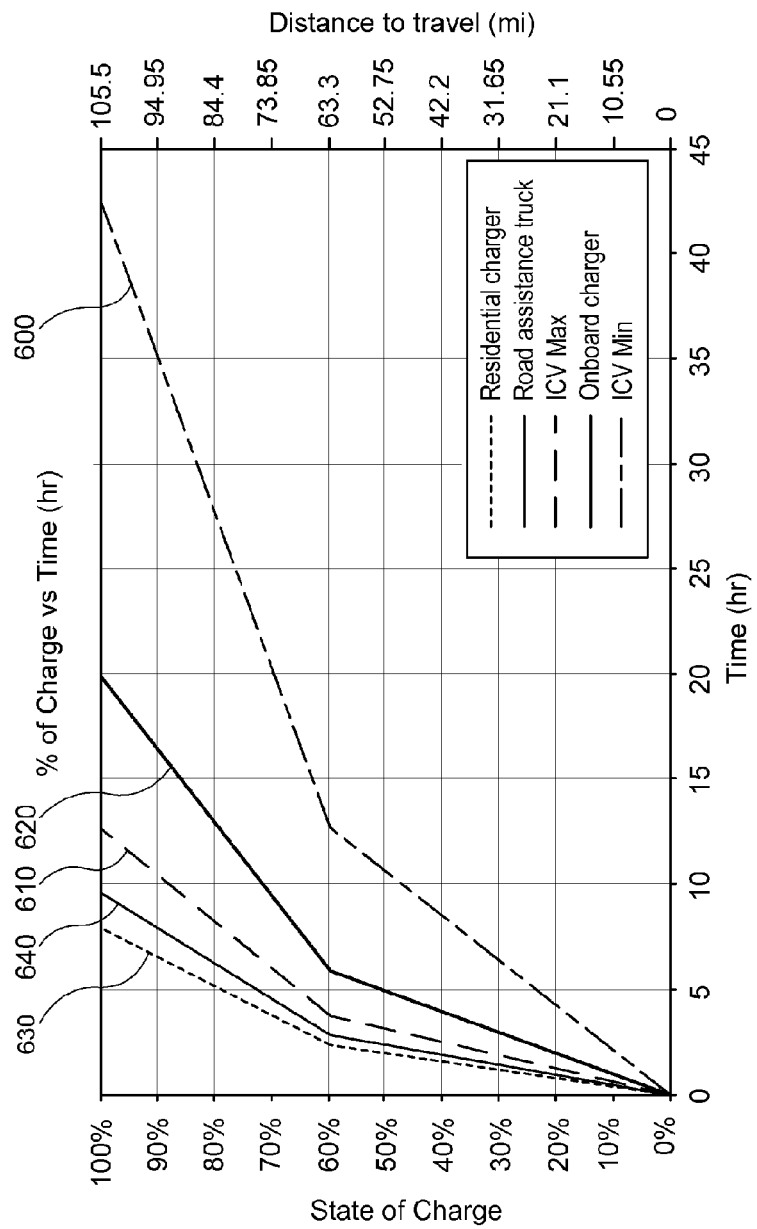
FIG. 9 is a chart depicting estimates of the state of charge versus time and distance to travel versus time achievable by an embodiment of a portable electric vehicle charging device, in combination with a variety of different internal combustion engine vehicles, in accord with at least some aspects of the present concepts, in relation to other conventional charging devices.

The ICV Min plot 600 and ICV Max plot 610 from FIG. 8 are compared in FIG. 9 to similar plots for an "On Board" Charger (plot 620), a residential charger (plot 630), and an ICV Super-Duty truck or the like (e.g., a road-assistance truck, etc.) (plot 640). The chart of FIG. 9 depicts estimates of the state of charge versus time and distance to travel versus time achievable by a portable electric vehicle charging device 100 in accord with aspects of the present concepts, in combination with a variety of different internal combustion engine vehicles 200, in relation to an on-board charger and a residential charger. The interpolated ICV Min plot 600 yields a 100% charge at 42.67 hours with an indicated 60% charge at 12.80 hours. The interpolated ICV Max plot 610 yields a 100% charge at 12.80 hours with an indicated 60% charge at 3.84 hours. The interpolated ICV Max plot 610 shows enhanced performance over that of the "On Board" Charger (plot 620), which shows a 100% charge at 20.00 hours with an indicated 60% charge at 6.00 hours. The interpolated ICV Super-Duty plot 640 predicts a 100% charge at 9.60 hours with an indicated 60% charge at 2.88 hours. FIG. 9 shows that the residential charger, plot 630, is only slightly better than that of the interpolated ICV Super-Duty plot 640, with a 100% charge at 8.00 hours and an indicated 60% charge at 2.4 hours.

Figure 10A:
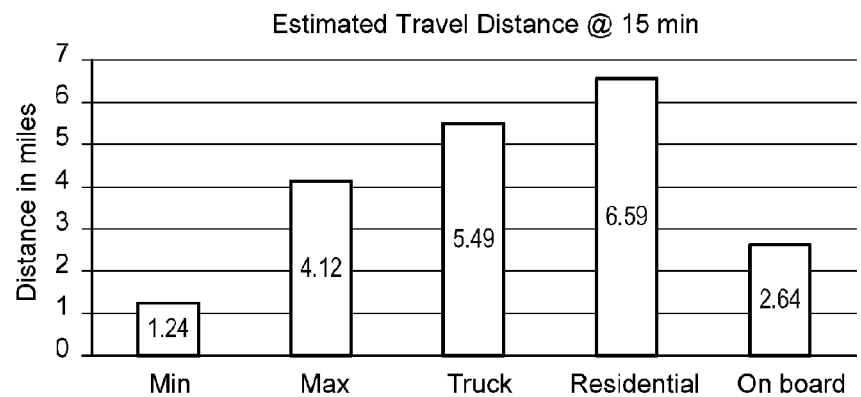
FIGS. 10A-10B show, for two different charging times, bar charts of estimated distances achievable by an embodiment of a portable electric vehicle charging device, in combination with a variety of different internal combustion engine vehicles, in accord with at least some aspects of the present concepts, in relation to other conventional charging devices.
Figure 10B:
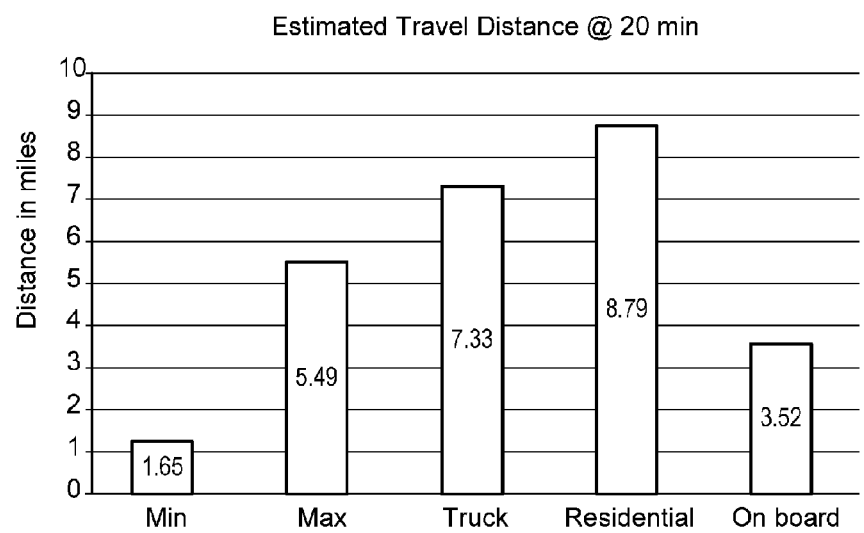

FIGS. 10A-10B show, for charging times of 15 minutes and 20 minutes, respectively, bar charts of estimated distances achievable by an EV such as the Nissan Leaf® EV, following charging with a variety of EV charging devices inclusive of the portable EV charging device 100 disclosed herein.

FIG. 10A shows that the ICV Min provides, in 15 minutes, a charge that is estimated to allow the EV to travel 1.24 miles and shows that the ICV Max provides in the same time period a charge that is estimated to allow the EV to travel 4.12 miles. The ICV Super-Duty or the like provides, in 15 minutes, a charge that is estimated to allow the EV to travel 5.49 miles. Turning then to the conventional residential charger, the residential charger provides, in 15 minutes, a charge that is estimated to allow the EV to travel 6.59 miles. Lastly, the EV on-board charger provides, in 15 minutes, a charge that is estimated to allow the EV to travel 2.64 miles.

Turning to FIG. 10B, the ICV Min provides in 20 minutes a charge that is estimated to allow the EV to travel 1.65 miles and the ICV Max provides in 20 minutes a charge that is estimated to allow the EV to travel 5.49 miles. The ICV Super-Duty provides, in 20 minutes, a charge that is estimated to allow the EV to travel 7.33 miles. Turning then to the conventional residential charger, the residential charger provides, in 20 minutes, a charge that is estimated to allow the EV to travel 8.79 miles. Lastly, the "On-Board" charger provides, in 20 minutes, a charge that is estimated to allow the EV to travel 3.52 miles.

Figure 11:
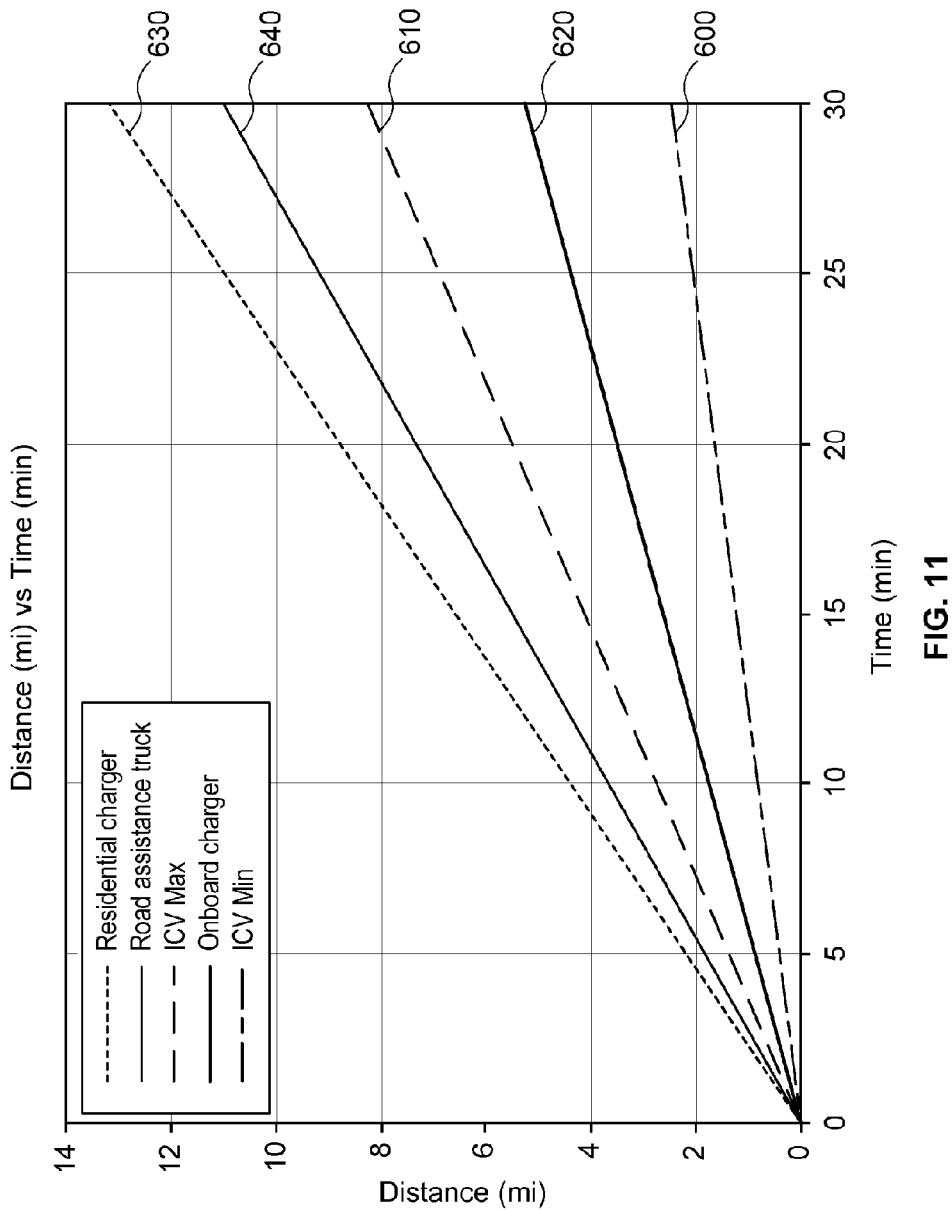
FIG. 11 shows a graph of distance versus time achievable by different EV charging sources over time, inclusive of the portable electric vehicle charging device in accord with at least some aspects of the present concepts.

FIG. 11 shows a graph of distance versus time (for times between 0-30 minutes) achievable by different EV charging sources over time, inclusive of the portable electric vehicle charging device 100 disclosed herein. The output of the residential charger (plot 630) is a charge sufficient for the EV to travel about 13.2 miles following a charge duration of 30 minutes, about 8.79 miles following a charge duration of 20 minutes, and about 6.59 miles following a charge duration of 15 minutes. Plot 640 for the ICV Super-Duty truck, used in combination with the portable EV charging device 100, provides a charge sufficient for the EV to travel about 10.99 miles following a charge duration of 30 minutes, about 7.33 miles following a charge duration of 20 minutes, and about 5.49 miles following a charge duration of 15 minutes. Plot 640 for the ICV Super-Duty truck, used in combination with the portable EV charging device 100, also shows that this combination permits an EV to travel about 3.66 miles after a charge of only 10 minutes and about 1.83 miles after a charge of a mere 5 minutes.

FIG. 11 also shows, in plot 610, the results obtained by the ICV Max used in combination with the portable EV charging device 100. Plot 610 shows that this combination provides a charge sufficient for the EV to travel a little over 8.00 miles following a charge duration of 30 minutes, about 5.49 miles following a charge duration of 20 minutes, and about 4.12 miles following a charge duration of 15 minutes.

Plot 620 of FIG. 11 shows that the "on board" charger provides a charge sufficient for the EV to travel a little over 5.00 miles following a charge duration of 30 minutes, about 3.52 miles following a charge duration of 20 minutes, and about 2.64 miles following a charge duration of 15 minutes. Lastly, plot 600 shows that the ICV Min, used in combination with the portable EV charging device 100, provides a charge sufficient for the EV to travel a little over 2.4 miles following a charge duration of 30 minutes, about 1.65 miles following a charge duration of 20 minutes, and about 1.24 miles following a charge duration of 15 minutes.

Figure 12:
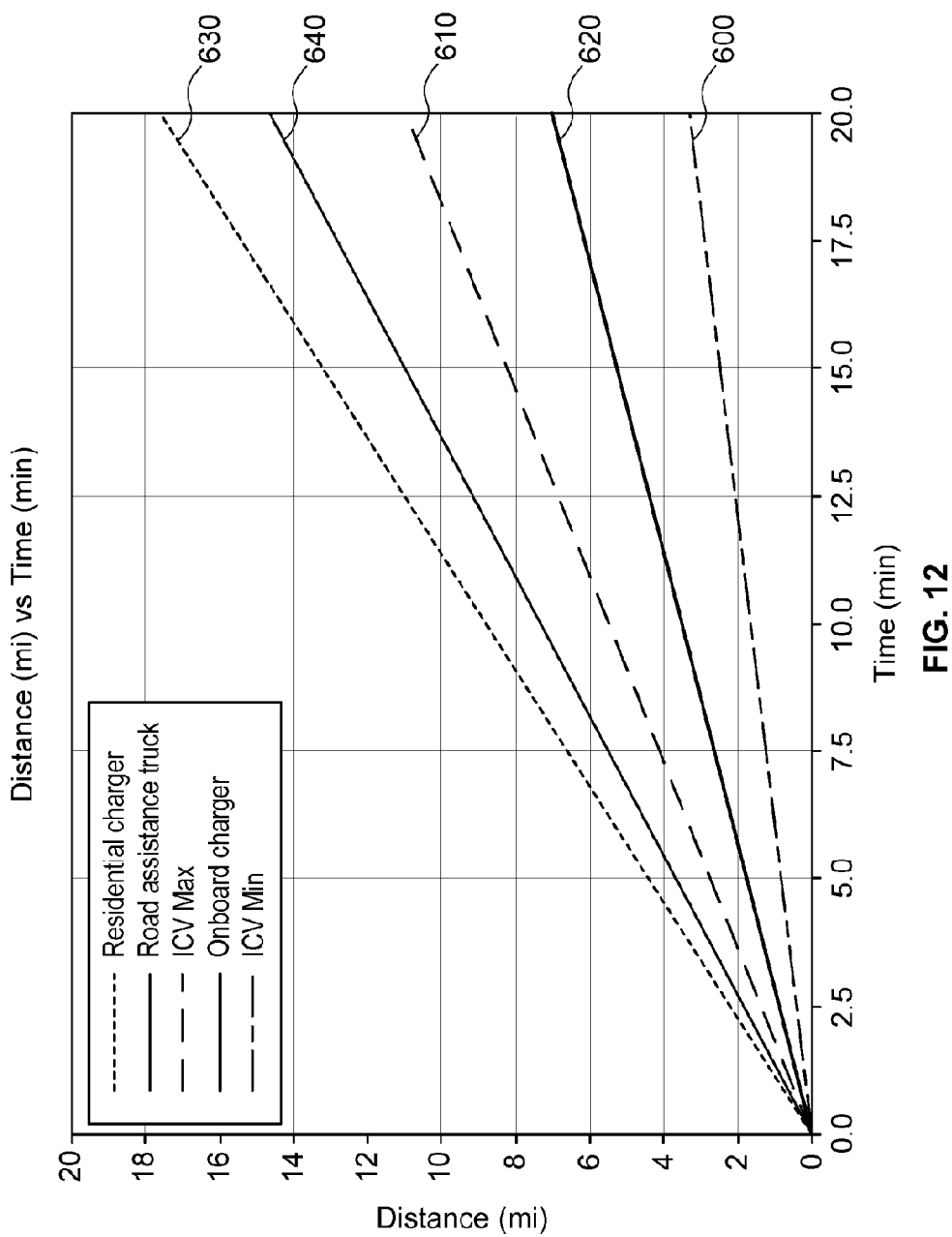
FIG. 12 shows a graph of expected distance versus time achievable by different EV charging sources over time, inclusive of the portable electric vehicle charging device in accord with at least some aspects of the present concepts, using estimates of EV battery system near-term developments in efficiency and/or materials.

FIG. 12 shows a graph of expected distance versus time achievable by different EV charging sources over time, inclusive of the portable electric vehicle charging device 100 disclosed herein, using estimates of EV battery system near-term developments in efficiency and/or materials.

Future EV-batteries are expected to include Carbon Nano-Tubes (CNT) that will increase the battery system storage capability between about 2-6× and which will enable charging at about twice the current rate. Lithium vanadium oxide is being currently tested by Subaru and appears to provide a doubled energy density. Silicon nanowires, silicon nanoparticles, and tin nanoparticles also promise several times the energy density in the anode, while composite and superlattice cathodes also promise significant density improvements. Additional developments are being investigated by SouthWest NanoTechnologies (SWeNT), which has developed two new grades in its SMW™ line of Specialty Multi-wall CNT. These materials are used as additives that enable higher electrical conductivity in polymer compounds and improved cathode performance in Lithium Ion batteries.

In view of these expected advances, FIG. 12 shows the expected impact of such emerging technologies when a portable EV charging device 100 in accord with the present concepts in used to charge such an EV using an internal combustion engine vehicle. With the predicted improvements in battery systems, the portable EV charging device 100 used in combination with an ICV Super-Duty truck is estimated to enable an EV to travel 14.65 miles following a 20 minute charge, as shown in plot 640. The same ICV Super-Duty truck provides, via the portable EV charging device 100, a charge sufficient for the EV to travel about 7.33 miles following a charge duration of a mere 10 minutes and to travel about 3.66 miles following a charge duration of only 5 minutes, as shown in plot 640. Likewise, as shown in plot 610 for an "ICV Max" using the portable EV charging device 100, a mere 10 minute charge would be sufficient for the EV to travel about 5.49 miles. Additional plots are presented in FIG. 12 showing the expected impact of such emerging technologies on the on-board charger (plot 620) and residential charger (plot 630).

The present concepts therefore provide a device by which many internal combustion vehicles can easily render assistance to a stranded EV and, within a relatively short period of 15-20 minutes, enable the stranded EV to reach a suitable charging station.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A portable electric vehicle (EV) charging device comprising:
    a housing;
    a DC input having a positive terminal and a negative terminal;
    an AC output;
    an EV electrical connector comprising an EV cable having a first end connected to the AC output and having a second end bearing an EV connector; and
    a circuit in the housing between the DC input and the AC output terminal, the circuit comprising an inverter rated for at least 500 watts continuous and configured to deliver AC power to the AC output,
    wherein the portable electric vehicle charging device has physical dimensions and a weight sufficient for the portable electric vehicle charging device to be easily lifted from a storage area in a passenger vehicle and carried to a location permitting connection of the portable electric vehicle charging device to both an EV and an adjacently disposed internal combustion vehicle, and
    wherein the portable electric vehicle charging device is in combination with a tangible medium bearing an indicia indicating that a user connect the positive terminal of the DC input to a positive terminal of a battery of an internal combustion engine vehicle and connect the negative terminal of the DC input to a negative terminal of the battery of the internal combustion engine vehicle, the indicia further indicating that the user connect the EV connector to an EV inlet located on an electric vehicle, wherein responsive to the DC input being connected to the battery of the internal combustion engine vehicle and the EV connector being connected to the EV inlet of the electric vehicle, the circuit causing the inverter to work to provide power to the EV inlet of the electric vehicle.

2. The portable electric vehicle charging device of claim 1, further comprising
    a first battery connector cable having a first end connected to the negative terminal of the DC input and having a second end bearing a battery terminal connector; and
    a second battery connector cable having a first end connected to the positive terminal of the DC input terminal and having a second end bearing a battery terminal connector.

3. The portable electric vehicle charging device of claim 2,
    wherein the first battery connector cable and the second battery connector cable comprise jumper cables integrated with the DC input,
    wherein the first battery connector cable and the second battery connector cable are between #0 AWG and #8 AWG, and
    wherein the EV connector comprises a J1772 connector.

4. The portable electric vehicle charging device of claim 2,
    wherein the first battery connector cable and the second battery connector cable are each removably connected to respective terminals of the DC input and comprise clip on battery terminal connectors at each end,
    wherein the first battery connector cable and the second battery connector cable are between #0 AWG and #8 AWG, and
    wherein the EV connector comprises a J1772 connector.

5. The portable electric vehicle charging device of claim 1, wherein the housing defines a volume less than about 1000 in³.

6. The portable electric vehicle charging device of claim 5, wherein a weight of the portable electric vehicle charging device is less than about 15 pounds.

7. The portable electric vehicle charging device of claim 1, wherein the housing defines a cable management system configured to secure the first battery connector cable, the second battery connector cable, and the EV connector in a stowed condition.

8. The portable electric vehicle charging device of claim 1, wherein the inverter is rated for up to about 3250 watts continuous.

9. The portable electric vehicle charging device of claim 8, wherein the AC power output to the electric vehicle over a period of 15 minutes provides an estimated travel distance for the electric car of at least between about 1-2 miles.

10. The portable electric vehicle charging device of claim 8, wherein the AC power output to the electric vehicle over a period of 15 minutes provides an estimated travel distance for the electric car of at least between about 2-4 miles.

11. The portable electric vehicle charging device of claim 8, wherein the AC power output to the electric vehicle over a period of 15 minutes provides an estimated travel distance for the electric car of at least between about 4-6 miles.

12. The portable electric vehicle charging device of claim 1,
wherein the circuit further comprises a step-up transformer to increase an output voltage of the inverter,
wherein the circuit further comprises a voltage regulator to regulate an inverter DC input, and
wherein the circuit further comprises an RL filter to condition an output of the step-up transformer.

13. A portable electric vehicle charging device comprising:
a) positive and negative battery connector cables;
b) an EV cable comprising an EV power connector;
c) an inverter rated for at least 500 watts continuous; and
d) a housing integrating at least b) and c) into a single unit,
wherein the portable electric vehicle charging device is configured to be stowed within a passenger vehicle when not in use, and
wherein the portable electric vehicle charging device further comprises:
a tangible medium bearing an indicia indicating that a user connect the positive battery connector cable to a positive terminal of a battery of an internal combustion engine vehicle and connect the negative battery connector cable to a negative terminal of the battery of the internal combustion engine vehicle, the indicia further indicating that the user connect the EV power connector to an EV inlet located on an electric vehicle, wherein responsive to the positive and negative battery connector cables being connected to the battery of the internal combustion engine vehicle and the EV power connector being connected to the EV inlet of the electric vehicle, the inverter working to provide power to the EV inlet of the electric vehicle.

14. The portable electric vehicle charging device of claim 13, wherein the positive and negative battery connector cables comprise jumper cables having a gauge between #0 AWG and #8 AWG, and wherein the EV power connector comprises a J1772 connector.

15. The portable electric vehicle charging device of claim 13, wherein the portable electric vehicle charging device housing defines a volume less than about 1000 in$^3$ and defines a cable management system configured to secure the battery connector cables, the EV cable, and the EV power connector in a stowed condition.

16. The portable electric vehicle charging device of claim 13, wherein a weight of the portable electric vehicle charging device is less than about 15 pounds.

17. The portable electric vehicle charging device of claim 16, wherein the inverter is configured to output AC power to an electric vehicle via the power EV power connector, over a period of about 15 minutes, sufficient to enable the electric vehicle to travel an estimated distance of at least between about 1-6 miles.

18. The portable electric vehicle charging device of claim 13, wherein the inverter is rated for between about 500 watts continuous and 3250 watts continuous.

19. The portable electric vehicle charging device of claim 13, further comprising:
a step-up transformer to increase an output voltage of the inverter;
a voltage regulator to regulate an inverter DC input, and
an RL filter to condition an output of the step-up transformer.

* * * * *